United States Patent [19]
Holloway et al.

[11] 3,753,184
[45] Aug. 14, 1973

[54] TEMPERATURE CONTROL SYSTEM
[75] Inventors: Thomas M. Holloway, Waukesha; Robert G. Weeks, Milwaukee, both of Wis.
[73] Assignee: Johnson Service Company, Milwaukee, Wis.
[22] Filed: Mar. 23, 1972
[21] Appl. No.: 237,371

[52] U.S. Cl.......................... 236/47, 165/16, 236/49
[51] Int. Cl................................................ F24f 7/06
[58] Field of Search .................. 236/47, 49; 165/16

[56] References Cited
UNITED STATES PATENTS
2,727,691 12/1955 Alyea et al...................... 236/47 X
3,220,649 11/1965 Story................................ 236/47 X Primary Examiner—William E. Wayner
Attorney—Johnson, Dienner, Wagner et al.

[57] ABSTRACT

A temperature control system which utilizes a two-level pneumatic pressure source and a control valve operative to selectively subject the control system to either of the two pressure levels or to a pulse of decreased pressure to effect normal night temperature, warm-up period temperature, and normal day temperature modes of operation.

9 Claims, 2 Drawing Figures

Patented Aug. 14, 1973     3,753,184

| SETTINGS FOR PRESSURE ELECTRIC SWITCH 62 | | |
|---|---|---|
| SW RELAY | CLOSE | OPEN |
| 70 | 3 ps: | 6 ps: |
| 86 | 16 ps: | 18 ps: |
| 94 | 12 ps: | 18 ps: |

TEMPERATURE CONTROL SYSTEM

BACKGROUND OF THE INVENTION

The present invention relates generally to temperature control systems, and more particularly to such a system having novel means for effecting nighttime, warm-up, and normal daytime temperature operation.

It is known to provide temperature control systems which provide three modes of temperature control. For example, a first temperature is maintained during the night or unoccupied period, a warm-up period is provided during which time the temperature is raised to the normal daytime temperature but without circulating and heating outside air, and the higher temperature is maintained during the daytime or occupied period with outside air heated and circulated. The known temperature control systems which provide three-modes of temperature operation control the unit ventilators in response to three levels of supply pressure. The temperature control system in accordance with the present invention provides an improvement over the known temperature control systems by providing three modes of temperature control using a two-level pressure supply source, thereby effecting a substantial economic advantage over the known systems.

SUMMARY OF THE INVENTION

In accordance with a preferred embodiment of the temperature control system of the present invention, a pneumatic dual room thermostat and a pressure electric switch of a unit ventilator are connected to a two-level pneumatic pressure supply source through a control valve operative selectively to connect the thermostat and pressure electric switch to either of the two pressure levels or momentarily to atmospheric pressure to provide a pulse of decreased pressure. A pneumatically operated control, such as a valve, is connected to the outlet of the dual room thermostat and controls the flow of an air conditioning medium such as steam to a heat exchange unit; it being understood that the control could be a switch for energizing electric heaters. A solenoid operated valve is connected to the output of the thermostat and controls a damper operative to control a flow of air from within a room in which the ventilator is situated and from outside the room for changing the temperature of the controlled air flow by means of the air conditioning medium within the heat exchange unit. The pressure electric switch includes three sections each of which includes a pneumatically operated relay responsive to a predetermined supply pressure to open and close an associated pair of switch contacts. The pressure electric switch is responsive to a first supply pressure to maintain the solenoid valve closed, so that the thermostat does not control damper operation. The damper thus, remains closed to outside air while the thermostat at such first pressure controls the temperature of the room at a first temperature by modulating the pneumatic control valve and causing intermittent fan operation by means of a pair of contacts of the pressure electric switch. The pressure electric switch is responsive to a second supply pressure to maintain the damper such that airflow from outside the room is closed off while placing the fan on continuous operation. The thermostat at such second pressure controls the temperature within the room at a second higher temperature by means of the pneumatic control valve, as during a morning warm-up period. The pressure electric switch is further responsive to a pulse of decreased pressure, as for example, a momentary connection to atmospheric pressure, to energize the solenoid valve placing the damper under control of the thermostat to provide a mixture of inside and outside airflow over the heat exchange unit. Thus, with such pressure pulse, the thermostat controls the temperature at the second temperature with continuous fan operation and outside air ventilation during normal day operation when it is expected that the room will be occupied.

Accordingly, one of the primary objects of the present invention is to provide a temperature control system operative to establish three modes of operation while employing only a two-level pressure source.

Another object of the present invention is to provide a pneumatic temperature control system wherein a two-pressure pneumatic thermostat employing a two-level pressure source efficiently provides three modes of operation.

Further objects and advantages of the present invention, together with the organization and manner of operation thereof, will become apparent from the following detailed description of the invention when taken in conjunction with the accompanying drawing.

DESCRIPTION OF A PREFERRED EMBODIMENT

Figures 1, 2:
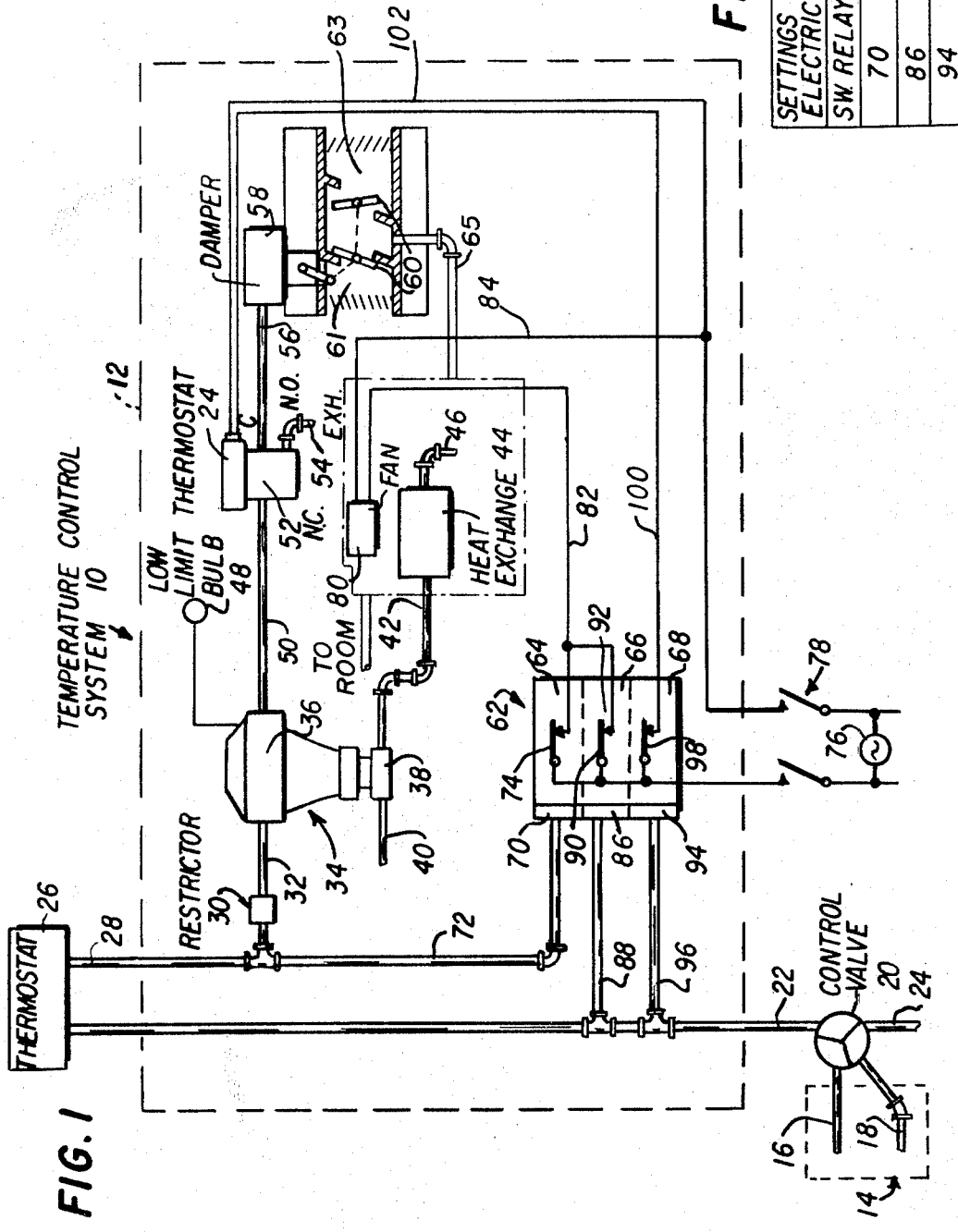
FIG. 1 schematically illustrates a temperature control system in accordance with the present invention.
FIG. 2 shows in chart form the operating characteristics of the pressure electric switch employed in the temperature control system of FIG. 1.

Referring now to the drawing, and in particular to FIG. 1, a schematic representation of a temperature control system in accordance with the present invention is indicated generally at 10. The temperature control system 10 includes a unit ventilator, shown schematically at 12, which comprises a housing enclosure for various elements of the control system as will become apparent hereinbelow. The unit ventilator 12 is conventionally positioned within an enclosed room or building the temperature of which is to be controlled by the temperature control system 10. The unit ventilator 12 is suitably positioned within the room and connected to air duct means or the like (not shown) for providing access to air from outside the room or building. As will be described more fully hereinbelow, the temperature control system 10 is operative to provide three modes of unit ventilator operation; namely, normal night operation at a first predetermined temperature, a warm-up or day unoccupied operation at a second predetermined temperature, and normal daytime or day occupied operation at the second temperature. During the normal night and warm-up modes of operation, the air from within the room in which the unit ventilator 12 is situated, normally termed inside air, is conditioned or tempered to obtain the first and second predetermined temperatures while the damper is closed to outside air, since the room is normally unoccupied. This saves on heating and cooling costs. During the normal daytime mode of operation, when the room usually is occupied, the temperature within the room is maintained at the second predetermined temperature but a mixture of inside and outside air is conditioned within the unit ventilator 12 so as to provide fresh air to the room.

The temperature control system 10 employs a two-level pneumatic pressure supply source, indicated generally as 14, which includes conventional means for providing a first regulated pneumatic supply pressure, such as 20 psi, through a pressure conduit 16, and means for providing a second regulated pneumatic supply pressure, such as 15 psi, through a second pressure conduit 18. The pressure conduits or lines 16 and 18 are connected to control valve means, indicated generally as 20, which is operable to selectively connect a system supply pressure conduit or line 22 to either of the pneumatic supply pressure lines 16 or 18 or to an exhaust port 24 open to atmosphere. The valve means 20 comprises a conventional three-position control valve which may be directly operated manually, or which may be operated by remote means such as a timing device to connect the system supply pressure line 22 to either of the inlet pressure lines 16 or 18 or to the exhaust port 24.

The system supply line 22 from the valve means 20 constitutes the inlet to thermostat means comprising a direct acting, dual temperature, proportional action thermostat 26 designed for individual control of day and night temperatures. The thermostat 26 has an outlet 28 and controls at a predetermined daytime setting when subjected to the 15 psi supply pressure from the pressure source 14, and controls at a predetermined night setting when subjected to the 20 psi supply pressure from the pressure source. As will become apparent hereinbelow, by switching the pneumatic supply pressure to the thermostat 26 by means of the control valve 20, the thermostat can be made to control the ambient temperature surrounding the thermostat during nighttime, warm-up and daytime periods without changing the dial setting on the thermostat. The thermostat 26 is of known design and is commerically available from Johnson Service Company, Milwaukee, Wisconsin, as either of Johnson models T-4502 or T-4512. The thermostat 26 may be provided with an indexing switch to allow the thermostat to be returned to a day temperature setting during a night cycle without switching the pneumatic supply pressure from the valve means 20 which may be remotely positioned relative to the thermostat 26 and the unit ventilator 12. It will be understood that while the thermostat 26 is described as employing pneumatic control pressures of 15 psi for daytime operation and 20 psi for nighttime operation, other control pressures could be selected.

The outlet 28 of the thermostat 26 comprises a pneumatic pressure conduit which is connected through a suitable restrictor 30 and a pressure conduit 32 to control means, indicated generally at 34, which in the described embodiment comprises control valve means 36. The control valve means 36 preferably comprises an integral thermostat and piston top valve operator of the type identified as model T-3110 commercially available from Johnson Service Company. The combination thermostat and a valve operator 36 provides proportional control of a normally open valve 38 which controls the flow of an air conditioning medium such as steam or hot water from a source (not shown) through a flow conduit 40, through the valve 38, and through a flow conduit 42 to a suitable heat exchange unit 44 of known design. The heat exchange unit 44 has an outlet or return flow conduit 46 for returning the steam or hot water to the source thereof after passage through the heat exchange unit. The control valve means 36 has a remote bulb element 48 which serves as a low limit thermostat control and operates in a known manner to cause flow of steam or hot water through valve 38 to heat exchange 44 under conditions where the ambient temperature drops below a preset minimum. If desired, the control means 34 may be replaced by coil by-pass damper means of known construction.

The outlet 28 of the thermostat 26 is further connected through a pressure conduit 50 to damper means including a solenoid air valve 52 having a normally closed connection to the pressure conduit 50. The air solenoid 52 has a normally open exhaust port 54 and a normally closed connection to a pressure conduit 56 which provides pneumatic control of a damper operator indicated schematically at 58. The air valve 52 is of known construction and is exemplified by model V-24 commerically available from Johnson Service Company, the assignee of the present invention. The damper operator 58 of the damper means is operative in response to the air valve 52 to selectively control a flow of air from within the room in which the unit ventilator 12 is installed and from outside the room such that a mix of air flow from within and outside the room may be passed over the heat exchange unit 44 for changing or tempering the temperature of the airflow by means of the heat exchange unit 44. The damper operator 58 is of known construction and conventionally includes interconnected mixing damper members, shown schematically at 60 in FIG. 1, the left one of which is normally open to inside air through duct 61 and the right one normally closing off the outside air duct 63 such that the damper operator 58 may be controlled to modulate the dampers in unison to mix air flow from inside and outside the room being controlled. This mixture of air flow is transmitted through line 65 to heat exchange unit 44 for changing or tempering the temperature of the air flow, and then is delivered into the room being controlled.

The temperature control system 10 includes pressure electric switch means, indicated generally at 62, which has a first section 64, a second section 66, and a third section 68. The first section 64 of the pressure electric switch means 62 includes a pneumatic relay portion 70 connected to the outlet 28 of the thermostat 26 through a pressure line or conduit 72. The relay 70 is responsive to a predetermined pneumatic pressure from the thermostat 26 to actuate a normally closed switch contact arm 74. The movable switch contact arm 74 and the associated fixed contact are connected in circuit with a source of electrical energy 76 through a main line switch, indicated generally at 78, to fan means 80 of known construction through a conductor 82. The fan means 80 is positioned in the temperature control system 10 to effect movement of air from the damper means 60 over the heat exchanger 44 and into the room in which the unit ventilator 12 is situated. The energizing circuit to the fan means 80 is completed to the electrical energy source 76 through a conductor 84. As can be seen by reference to the table of FIG. 2, the pressure relay 70 portion of the first section 64 of the pressure electric switch means 62 is conditioned to close the movable contact arm 74 when the control pressure in the pressure line 72 from the thermostat 26 is 3 psi or lower, and is conditioned to open the switch arm 74 when the pressure in the line 72 reaches 6 psi.

The second section 66 of the pressure electric switch means 62 includes a pneumatic relay portion 86 which is connected to the system supply pressure line 22 through a pressure conduit 88. The pneumatic relay 86 is similar in operation to the pneumatic relay 70 and is operative in response to a predetermined pressure in the pressure supply line 22 to actuate a normally closed switch contact arm 90 and effect energizing of the fan means 80 through a conductor 92 connected to the conductor 82 as shown. Again noting FIG. 2, the pneumatic relay 86 is adapted to close the movable contact arm 90 when the pressure within the line 88 is 16 psi or less, and is adapted to open the switch contact arm 90 when the pressure in line 88 reaches 18 psi.

The third section 68 of the pressure electric switch means 62 is similar to the first and second switch sections and includes a pneumatic relay 94 connected through a pressure line 96 to the system supply pressure line 22. The pneumatic relay 94 is similarly operative in response to a predetermined pressure in the line 22, as determined by the control valve means 20, to effect actuation of a normally closed movable switch contact arm 98 to selectively energize the solenoid air valve 52 through a conductor 100, the circuit to the solenoid air valve being completed to the source of electrical energy 76 through a conductor 102. As shown in FIG. 3, the pneumatic relay 94 is set to close the movable switch arm 98 when the pressure in the line 96 is 12 psi or less, and is set to open the contact arm when the pressure in the line 96 reaches 18 psi. The pressure electric switch means 62 is generally similar to the pressure electric switch commerically available from the afore-referenced Johnson Service Company as model P-7222, but modified such that the third switch section has its own pressure control line, such as the described pressure line 96 and its own set point adjustment set to close the movable contact arm 98 at 12 psi or less.

In operation, assume that main switch 78 is closed and the flow conduit 40 is connected to a suitable source of steam or hot water. When the control valve means 20 is positioned to subject the inlet line 22 of the thermostat 26 to 20 psi control pressure from the conduit 16 for night operation, the thermostat operates at a predetermined temperature as established by its setting. The 20 psi pressure is also supplied through lines 88 and 96 to the second and third sections 66 and 68, respectively, of pressure electric switch 62. This causes switch contact arms 90 and 98 of the second and third sections to be actuated to open condition so that the solenoid valve 52 is maintained in normally closed position, preventing control of damper means 60 by the thermostat and causing mixing damper means 60 to be positioned to prevent flow of air from outside the room. In this mode of night operation, the control valve means 36 and the first section 64 of the pressure electric switch means 62 are under the control of the thermostat 26. Assuming that the temperature in the room is above the night setting of the thermostat, the thermostat supplies via outlet 28 and line 72 a pressure in excess of 6 psi to the first switch section 64 of pressure electric switch 62. This pressure, as can be seen from the FIG. 2 table, actuates contact arm 74 open, deenergizing fan 80. When the temperature in the room in which the thermostat 26 is mounted falls below the predetermined nighttime temperature setting on the thermostat, the control valve means 36 will open and allow the air conditioning medium to pass through the heating exchange unit 44 due to a decrease in the pressure at the outlet 28 of the thermostat. Simultaneously, as the pressure at the outlet 28 of the thermostat 26 is reduced, the pressure in the line 72 is reduced. At 3 psi it will close the switch contact arm 74. Switch arm 74 in closing energizes the fan means 80 to effect movement of air from within the room over the heat exchange unit 44 and into the room from the unit ventilator 12. In this manner, intermittent fan operation continues during the night period modulated by thermostat 26 to maintain the temperature in the room at the predetermined nighttime setting.

When the period for warm-up is reached, as in the early morning in preparation for occupancy of the room, the control valve means 20 is actuated either manually or by a timing device to subject the inlet line 22 of the thermostat 26 to the reduced 15 psi supply pressure through the conduit 18. This places thermostat 26 on daytime setting to maintain the room at a preset temperature higher than nighttime temperature. This reduction to 15 psi is also applied over line 88 to the pneumatic pressure relay 86, effecting closing of the contact arm 90 of the second section 66 of the pressure electric switch means 62. Contact arm 90, in closing, shunts contact arm 74 and energizes the fan means 80 for continuous operation. Simultaneously, the control valve means 36 is responsive to the reduced pneumatic pressure at the outlet 28 of the thermostat 26 to move to open position allowing the air conditioning medium to flow through the heat exchange unit 44 to increase the room temperature. The temperature of the room in which the thermostat 26 is located will rise and be maintained at a second or normal daytime temperature, as established by the daytime setting of the thermostat 26, while the mixing damper means 60 remains in a position closing the flow of air from outside the room so that only inside air is circulated over the heat exchange unit 44 and into the room.

When the time is reached for occupancy of the room, at which time the daytime temperature and ventilation with fresh, outside air is desired, the control valve means 20 is momentarily moved to a position to connect the thermostat inlet supply line 22 to the exhaust port 24 and then back to reconnect line 22 to inlet 18 and 15 psi. With such brief connection to exhaust 24 the pressure within the inlet line 22 momentarily drops below 12 psi. When this pulse of decreased pressure occurs, the pneumatic relay 94, being set to close the associated contact arm 98 when the supply pressure reaches 12 psi or lower, effects energization of the solenoid air valve 52. This places the damper operator 58 under the control of the room thermostat 26 and low-limit thermostat 48. Once tripped closed by this sudden decrease in pressure, switch arm 98 remains closed as the pressure in line 22 returns to 15 psi, as can be seen from the table in FIG. 2. This allows modulation of damper 50 by thermostat 26 to allow fresh air intake to the room. During this period, the control valve means 36 is open to allow circulation of the air conditioning medium through the heat exchange unit 44, and the switch contacts of the second section 66 of the pressure electric switch means 62 are closed to effect continuous fan operation.

At the end of the day, the control valve means 20 is again actuated to connect the thermostat inlet supply line 22 to the higher inlet pressure line 16 to again effect night temperature operation.

Thus, it can be seen that the thermostat means 26 and the switch means 62 are responsive to a first pressure from the two-level pressure supply source 14 to control the damper means 58 and 60 such that airflow from outside the room is closed while the thermostat 26 controls the temperature in the room at a first nighttime temperature with intermittent fan operation. The thermostat 26 and the switch means 62 are responsive to the second supply pressure of 15 psi from the pressure source 14 to control the damper means 58 and 60 such that airflow from outside the room is closed while the thermostat 26 controls the temperature within the room at a second temperature with continuous fan operation. The switch means 62 is responsive to a pulse of decreased pressure sufficient to trip switch 68 closed to place the damper means 58 and 60 under the control of thermostat 26 to modulate the damper means such that a mixture of airflow from within and outside the room is conditioned by the air conditioning medium within the heat exchange unit 44 while the thermostat 26 controls the temperature within the room at the second or daytime temperature with continuous fan operation.

While a preferred embodiment of the present invention has been illustrated and described, it will be obvious to those skilled in the art that changes and modifications may be made therein without departing from the invention in its broader aspects.

We claim:

1. A temperature control system for controlling the temperature of a room or the like having access to outside air, comprising, in combination, first control means controlling an air conditioning medium, damper means to selectively control the flow of air from within the room and from outside the room to subject said air to said air conditioning medium, thermostat means having an inlet and an outlet, a two-level source of fluid pressure, first conduit means including second control means interconnecting said pressure source to said inlet of said thermostat means, said second control means being operable to selectively connect said thermostat means to either of said two levels of pressure, switch means responsive to the pressure at the inlet of said thermostat means, means connecting said outlet of said thermostat means to said first control means and to said damper means to operate the same, said thermostat means being responsive to a first pressure from said source to control said first control means to temper air maintaining the room at a first temperature, said thermostat means being responsive to a second pressure from said source to control first control means to maintain the temperature within the room at a second temperature, said switch means being responsive to both said first and second pressure to maintain said damper means in condition to circulate only inside air to said room, and means provided for causing a momentary predetermined decrease in pressure in said inlet, said switch means being responsive to said momentary decrease for placing said damper means under control of said thermostat such that a mixture of airflow from within and outside the room is conditioned by said air conditioning medium while said thermostat means controls the temperature within the room at said second temperature.

2. A control system as defined in claim 1 wherein said means for causing a momentary predetermined decrease in pressure comprises means for momentarily connecting said inlet to atmospheric pressure.

3. A control system as defined in claim 1 wherein said second control means includes said means for causing a said predetermined decrease in pressure.

4. A temperature control system for controlling the temperature of a room or the like having access to outside air, comprising, in combination, first control means controlling the flow of an air conditioning medium, damper means to selectively control the flow of air from within the room and from outside the room to subject said air to said air conditioning medium, thermostat means having an inlet and an outlet, a two-level source of fluid pressure, first conduit means including second control means interconnecting said pressure source to said inlet of said thermostat means, said second control means being operable to selectively connect said thermostat means to either of said two levels of pressure, switch means having a first section responsive to the pressure at the outlet of said thermostat means, said switch means having second and third sections responsive to the pressure at the inlet of said thermostat means, means connecting said outlet of said thermostat means to said first control means and to said damper means to operate the same, said thermostat means being responsive to a first pressure from said source to control said first control means to temper air maintaining the room at a first temperature, said thermostat means being responsive to a second pressure from said source to control said first control means to maintain the temperature within the room at a second temperature, said switch means being responsive to both said first and second pressures to maintain said damper means in condition to circulate only inside air to said room, and means provided for causing a momentary predetermined decrease in pressure in said inlet, said switch means being responsive to said momentary decrease for placing said damper means under control of said thermostat such that a mixture of airflow from within and outside the room is conditioned by said air conditioning medium while said thermostat means controls the temperature within the room at said second temperature.

5. A control system as defined in claim 4, wherein said means for causing a momentary predetermined decrease in pressure comprises means for momentarily connecting said inlet to atmospheric pressure.

6. A control system as defined in claim 4 wherein said second control means includes said means for causing a said predetermined decrease in pressure.

7. A control system as defined in claim 4 wherein said switch means comprises pressure electric relay means having said first, second and third sections, said first section being connected through pressure conduit means to said outlet of said thermostat means, and said second and third sections being connected to said first conduit means so as to be responsive to the pressure within said first conduit means as determined by said second control means.

8. A control system as defined in claim 4 including fan means operatively connected to said switch means for selectively effecting flow of air from said damper means into the room.

9. A control system as defined in claim 8 including means connecting said fan means to said first and second sections of said switch means such that said fan means is controlled for intermittent operation by said thermostat means when said thermostat is subjected to said first pressure from said source, said fan means being continuously energized when said thermostat means and said switch means are subjected to said second pressure from said source.

\* \* \* \* \*